US008351886B1

(12) United States Patent
Karnik

(10) Patent No.: US 8,351,886 B1
(45) Date of Patent: Jan. 8, 2013

(54) VOLTAGE REGULATOR WITH A BANDWIDTH VARIATION REDUCTION NETWORK

(75) Inventor: Kiran Karnik, Kernersville, NC (US)

(73) Assignee: TriQuint Semiconductor, Inc., Hillsboro, OR (US)

( * ) Notice: Subject to any disclaimer, the term of this patent is extended or adjusted under 35 U.S.C. 154(b) by 352 days.

(21) Appl. No.: 12/700,663

(22) Filed: Feb. 4, 2010

(51) Int. Cl.
*H04B 1/16* (2006.01)
*H04B 1/18* (2006.01)

(52) U.S. Cl. .................................. 455/195.1; 455/169.1

(58) Field of Classification Search ............... 455/127.2, 455/127.3, 194.2, 195.1, 169.1; 323/280, 323/316, 269, 351, 274, 277–278
See application file for complete search history.

(56) References Cited

U.S. PATENT DOCUMENTS

| | | | | |
|---|---|---|---|---|
| 5,191,278 | A | 3/1993 | Carpenter | |
| 5,686,820 | A * | 11/1997 | Riggio, Jr. | 323/273 |
| 5,744,944 | A | 4/1998 | Danstrom | |
| 7,196,501 | B1 | 3/2007 | Dunipace | |
| 7,551,032 | B2 * | 6/2009 | Dupuis et al. | 330/285 |
| 7,821,240 | B2 * | 10/2010 | Oddoart et al. | 323/269 |
| 8,080,984 | B1 * | 12/2011 | Geynet | 323/280 |
| 2008/0129256 | A1 | 6/2008 | La Placa | |
| 2008/0224679 | A1 | 9/2008 | Sahni | |
| 2011/0248693 | A1 * | 10/2011 | Karnik et al. | 323/280 |

* cited by examiner

*Primary Examiner* — Sonny Trinh
(74) *Attorney, Agent, or Firm* — Schwabe Williamson & Wyatt

(57) ABSTRACT

Embodiments of circuits, apparatuses, and systems for a voltage regulator with a bandwidth variation reduction network are disclosed. Other embodiments may be described and claimed.

19 Claims, 5 Drawing Sheets

VOLTAGE REGULATOR WITH A BANDWIDTH VARIATION REDUCTION NETWORK

FIELD

Embodiments of the present disclosure relate generally to the field of circuits, and more particularly to a voltage regulator with a bandwidth variation reduction network.

BACKGROUND

Low dropout (LDO) voltage regulators are a class of linear voltage regulators that are specifically designed to operate with small differentials between an input voltage and an output voltage. A typical LDO voltage regulator will have a metal oxide semiconductor field effect transistor (MOSFET) connected between a supply voltage and an output voltage. The MOSFET may have a gate connected to an output of an operational amplifier and may be, along with one or more resistors, part of a feedback network for the operational amplifier. The gain-bandwidth product of the feedback network is dependent on the gain of the MOSFET and the bandwidth of the feedback network, which may change as a function of an output load current.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific devices and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present disclosure; however, the order of description should not be construed as to imply that these operations are necessarily order dependent. In particular, these operations need not be performed in the order of presentation.

The phrase "in one embodiment" is used repeatedly. The phrase generally does not refer to the same embodiment;

however, it may. The terms "comprising," "having," and "including" are synonymous, unless the context dictates otherwise.

In providing some clarifying context to language that may be used in connection with various embodiments, the phrases "A/B" and "A and/or B" mean (A), (B), or (A and B); and the phrase "A, B, and/or C" means (A), (B), (C), (A and B), (A and C), (B and C) or (A, B and C).

The term "coupled with," along with its derivatives, may be used herein. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled to each other.

Figure 1:
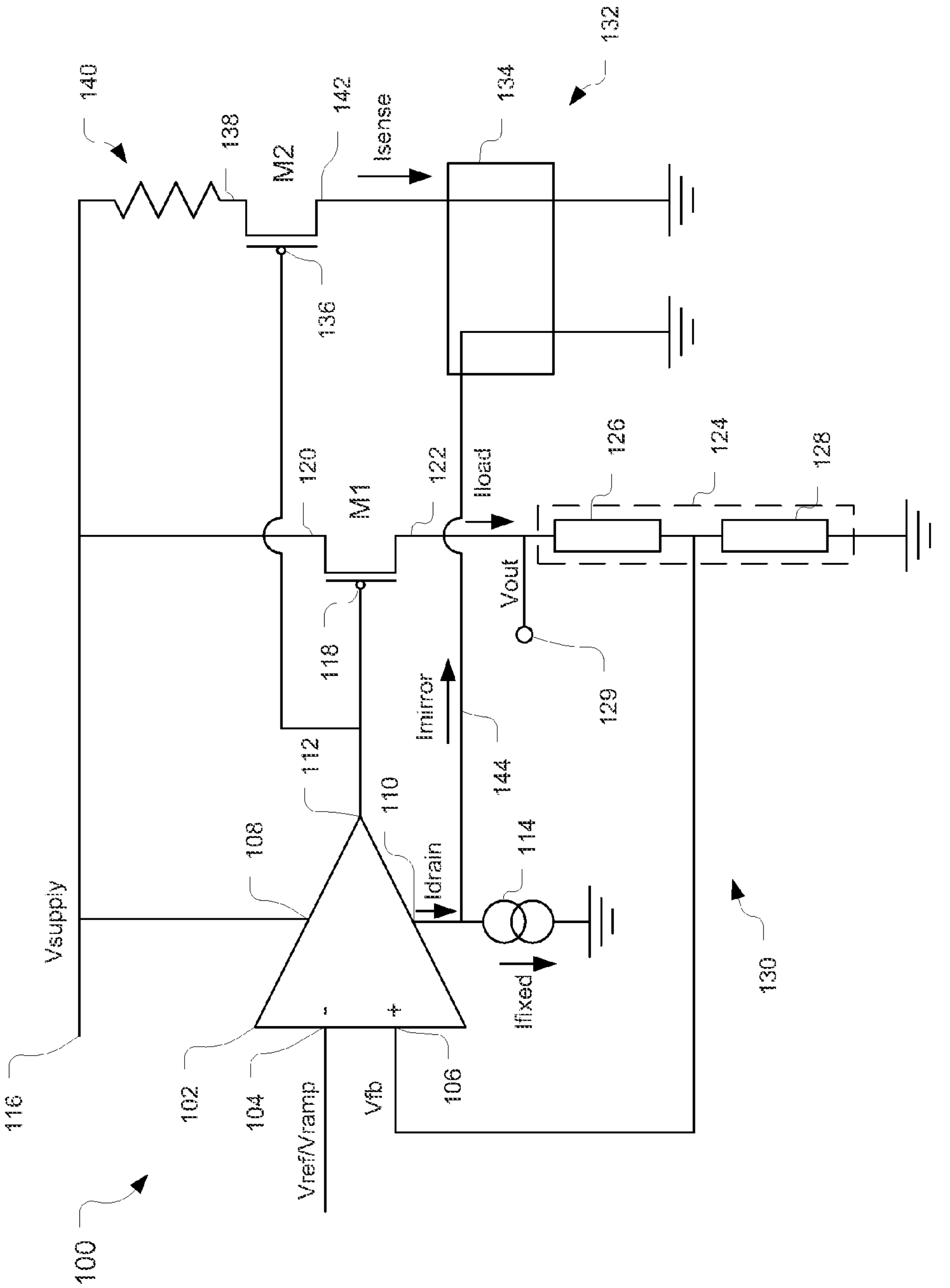
FIG. 1 illustrates a voltage regulator.

FIG. 1 illustrates a voltage regulator 100 in accordance with some embodiments of this disclosure. The voltage regulator 100 may be any type of regulator including, e.g., a linear LDO voltage regulator. The voltage regulator 100 may include an operational amplifier (op amp) 102 having a first input, e.g., inverting input 104, a second input, e.g., non-inverting input 106, a positive power supply terminal 108, a negative power supply terminal 110, and an output 112. The inverting input 104 may be coupled with a reference or ramp voltage (Vref/Vramp). In general, a reference voltage may be considered to be a substantially constant voltage, while a ramp voltage may be a voltage that varies with time during operation of the voltage regulator 100. The non-inverting input 106 may be coupled with a feedback voltage (Vfb); the positive power supply terminal 108 may be coupled with a supply rail 116 that provides a supply voltage (Vsupply); and the negative power supply terminal 110 may be coupled with a constant current generator 114 that provides a constant current (Ifixed).

The voltage regulator 100 may also include a pass transistor M1. The pass transistor M1 may be a positive type (p-type) MOSFET with a gate 118 coupled with the output 112 of the op amp 102; a source 120 coupled with the supply rail 116; and a drain 122 coupled with a ground through a voltage divider 124 that includes components 126 and 128 coupled in series with one another. Components 126 and 128 provide series impedances that result in Vfb being a fraction of an output voltage (Vout) at output node 129.

The voltage regulator 100, in general, may function to regulate Vout, e.g., to provide Vout at a substantially constant level for a given Vref/Vramp, notwithstanding variations in Vsupply. A feedback network 130, which includes the pass transistor M1 and the voltage divider 124, may provide Vfb to the op amp 102, which amplifies a difference between Vfb and Vref/Vramp and uses the amplified result to drive the pass transistor M1. The difference between Vfb and Vref/Vramp may be referred to as a differential input voltage, and the amplified result may be referred to as an amplified differential input voltage. If Vout is too low, which may result from a drop in Vsupply and/or an increase in load current (Iload), the op amp 102 may drive the pass transistor M1 to increase Vout. Conversely, if Vout is too high, the op amp 102 may drive the pass transistor M1 to decrease Vout.

Performance of the voltage regulator 100 may be described in the context of line regulation, e.g., regulation of Vout in response to variations in Vsupply, and load regulation, e.g., regulation of Vout in response to variations in Iload. Performance of the voltage regulator 100 may further be determined by responsiveness of Vout to changes in Vref/Vramp (when Vref/Vramp varies), which may be referred to as a bandwidth of the feedback network 130. The higher the bandwidth of the feedback network 130, the quicker Vout will reflect changes in Vref/Vramp.

As discussed above, a bandwidth of a feedback network may vary based on a load current. Embodiments of the present disclosure provide a bandwidth variation reduction (BVR) network 132 to reduce variation of the bandwidth of the feedback network 130. In some embodiments, the BVR network 132 may reduce the variation of the bandwidth by dynamically adjusting a gain of the op amp 102 by providing a current to the op amp 102 that is based on Iload, as will be described in detail below.

The BVR network 132 may include a replica transistor M2 and a current mirror 134. The BVR network 132 may also include the constant current generator 114. The replica transistor M2 may include a gate 136 that is also coupled with the output 112 of the op amp 102; a source 138 coupled with supply rail 116 through a resistor 140; and a drain 142 coupled with the current mirror 134. The replica transistor M2 may be proportional in size to the pass transistor M1. In some embodiments, the size of the replica transistor M2 may be scaled to be 1/m the size of the pass transistor M1, where m is greater than one. With this proportional relationship, replica transistor M2 may be considered a fractional proportion of the pass transistor M1. A sensed current (Isense) flowing through the replica transistor M2 may be provided by:

$$Isense=(V\_GS(M1)-V\_GS(M2))/Rsense, \quad \text{Equation 1}$$

where V_GS(M1) is a gate to source potential of pass transistor M1; V_GS(M2) is a gate to source potential of replica transistor M2; and Rsense is a resistance of the resistor 140.

The current mirror 134 may mirror Isense in order to provide a mirrored current (Imirror) in a line 144 that is coupled with the negative power supply terminal 110. Imirror may be proportional in magnitude to Isense, the particular proportional value being dependent on relative sizes of the components of the current mirror 134. As used herein and unless the context dictates otherwise, proportionality among hardware components, e.g., transistors, may refer to a proportional relationship between the size of the hardware components; and proportionality among electrical values, e.g., currents, may refer to a proportional relationship between the magnitude of the electrical values.

As Iload increases, gate potentials on the pass transistor M1 and replica transistor M2 will drop, resulting in increases in V_GS(M1) and V_GS(M2). This may result in a corresponding increase in both Isense and Imirror. Accordingly, Iload may be considered proportional to both Isense and Imirror.

An increase in Imirror, resulting from a corresponding increase in Iload, will result in a greater current being provided to the op amp 102. The current provided to the op amp 102 may be referred to as Idrain, which is a sum of Ifixed and Imirror. In some embodiments, the greater current provided to the op amp 102 will be provided to an input stage of the op amp 102. The input stage may include a pair of input differential transistors as will be shown below in FIGS. 2 and 3. While Idrain is shown in FIG. 1 as being provided at the negative power supply terminal 110, other embodiments may provide Idrain, or a mirrored version thereof, to other terminals of the op amp 102, e.g., to the positive power supply terminal 108 similar to an embodiment shown in FIG. 3. Increasing Idrain may increase a transconductance, $g_m$, of the op amp 102, which is proportional to a square-root of Idrain as given by the following equation:

$$g_m \alpha \sqrt{(2*\beta*I_{drain})}, \quad \text{Equation 2}$$

where β is a function of length and width of transistors of the op amp 102 An increase in $g_m$ may result in a corresponding increase in a gain of the op amp 102. The increased gain will result in a higher amplified differential input voltage being used to drive the gate 118 of the pass transistor M1, thereby causing Vout to respond quicker to changes in Vref/Vramp. Thus, the BVR network 132 may dynamically adjust, e.g., increase, the bandwidth of the feedback network 130 by dynamically adjusting, e.g., increasing, the gain of the op amp 102 in response to changes in Iload.

Tying the gain to Iload may result in the op amp 102 consuming less current during no-load and low load conditions, thereby lowering overall current consumption of the regulator 100. Furthermore, the voltage regulator 100 may experience increased line and load regulation performance, as it will be less susceptible to high-frequency signals on the supply rail 116 and will respond quickly to changes in Vref/Vramp.

The voltage regulator 100 may be capable of robust operation over a large range of operating temperatures, e.g., from about −40 degrees Celsius (C) to about 120 degrees C., and over varying Vsupply values, e.g., from about 2.85 volts (V) to about 5.1 V. Furthermore, the voltage regulator 100 may also be capable of stable operation, e.g., being relatively free of oscillations, over the temperature and supply voltage ranges.

Figure 2:
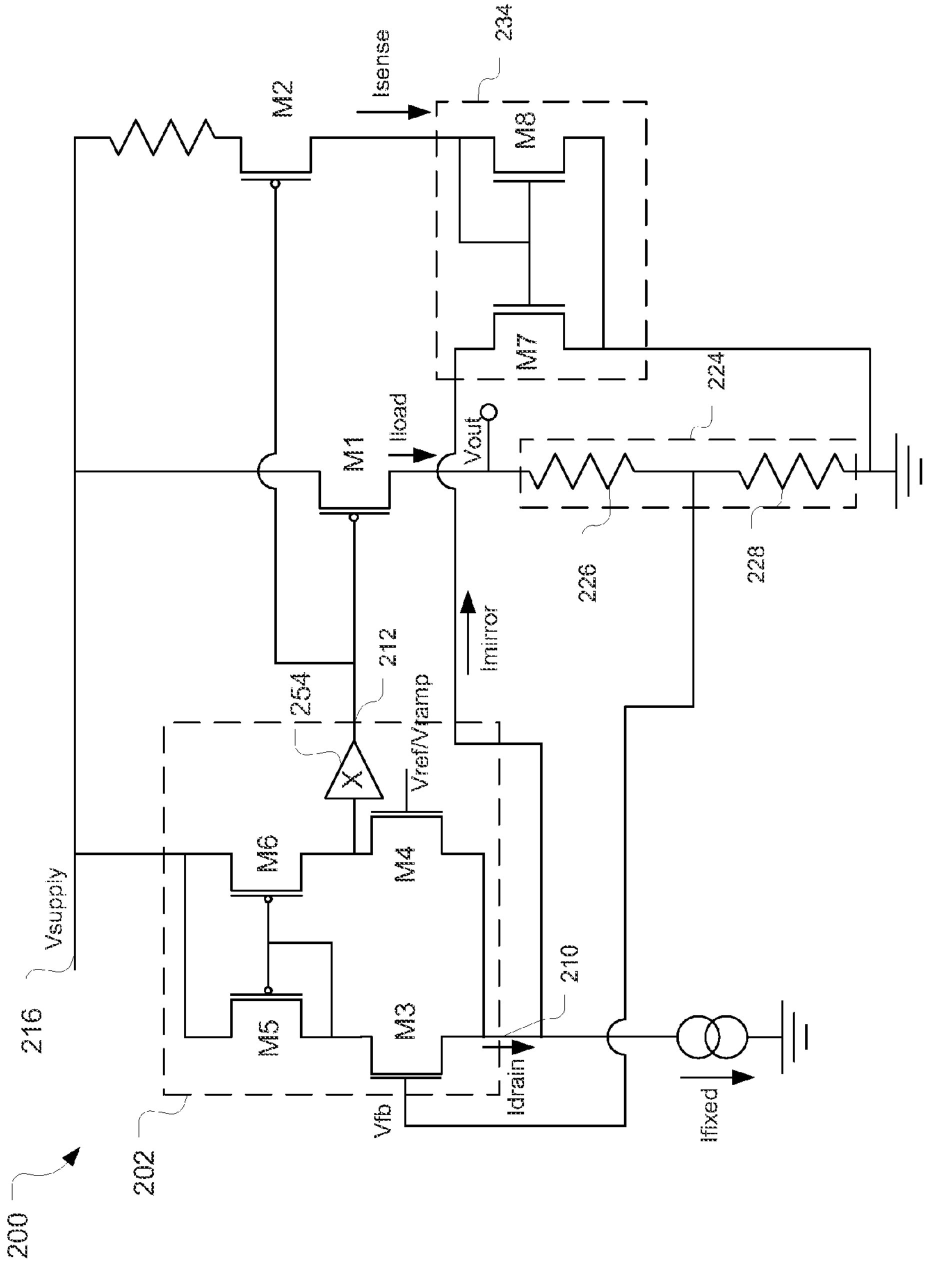
FIG. 2 illustrates another voltage regulator.

FIG. 2 illustrates a voltage regulator 200 in accordance with an embodiment. Other than the noted differences, the voltage regulator 200 may be similar to voltage regulator 100, with like-named components operating in similar manners. In this embodiment, an op amp 202 may be a single-stage op amp that includes a pair of negative type (n-type) MOSFETs, e.g., transistor M3 and transistor M4, and a pair of p-type MOSFETs, e.g., transistor M5 and transistor M6, as shown. Transistors M5 and M6 may each have a source coupled with a supply rail 216. A gate of transistor M5 may be coupled with a drain of transistor M5. A gate of transistor M6 may also be coupled with the drain of transistor M5. A drain of transistor M6 may be coupled with an output 212 of the op amp 202 through a buffer 254, which is configured to buffer an output signal provided to a pass transistor M1. A source of transistor M4 may also be coupled with the output 212 through the buffer 254. Transistors M4 and M3 may each include a drain coupled with a negative power supply terminal 210 of the op amp 202. A source of transistor M3 may be coupled with the drain of transistor M5 as well as the gates of transistors M5 and M6. The differential inputs, e.g., Vfb and Vref/ramp, may be provided to gates of the transistors M3 and M4, respectively, which may be considered the input stage of the op amp 202.

The current mirror 234 of the voltage regulator 200 may include a pair of n-type MOSFETS, e.g., transistor M7 and transistor M8. The transistor M8 may include a source coupled with both a drain of a replica transistor M2 and gates of transistors M8 and M7. The transistor M7 may include a source coupled with the negative power supply terminal 210. Transistors M7 and M8 may include drains coupled with ground. The relative dimensions of transistor M7 and transistor M8 may determine the proportionality between Imirror and Isense. For example, assuming transistor M7 has a width of y, transistor M8 has a width of x, and both transistors have similar lengths, Imirror may be given by the following equation:

$$Imirror=Isense*(y/x). \quad \text{Equation 2}$$

Imirror is considered a fractional proportion of Isense when the proportionality of Imirror to Isense is dictated by the relationship of Equation 2 and x is larger than y.

The components of a voltage divider 224 may be a resistor 226 and resistor 228. These resistors may provide the series impedances that result in Vfb as described above.

Figure 3:
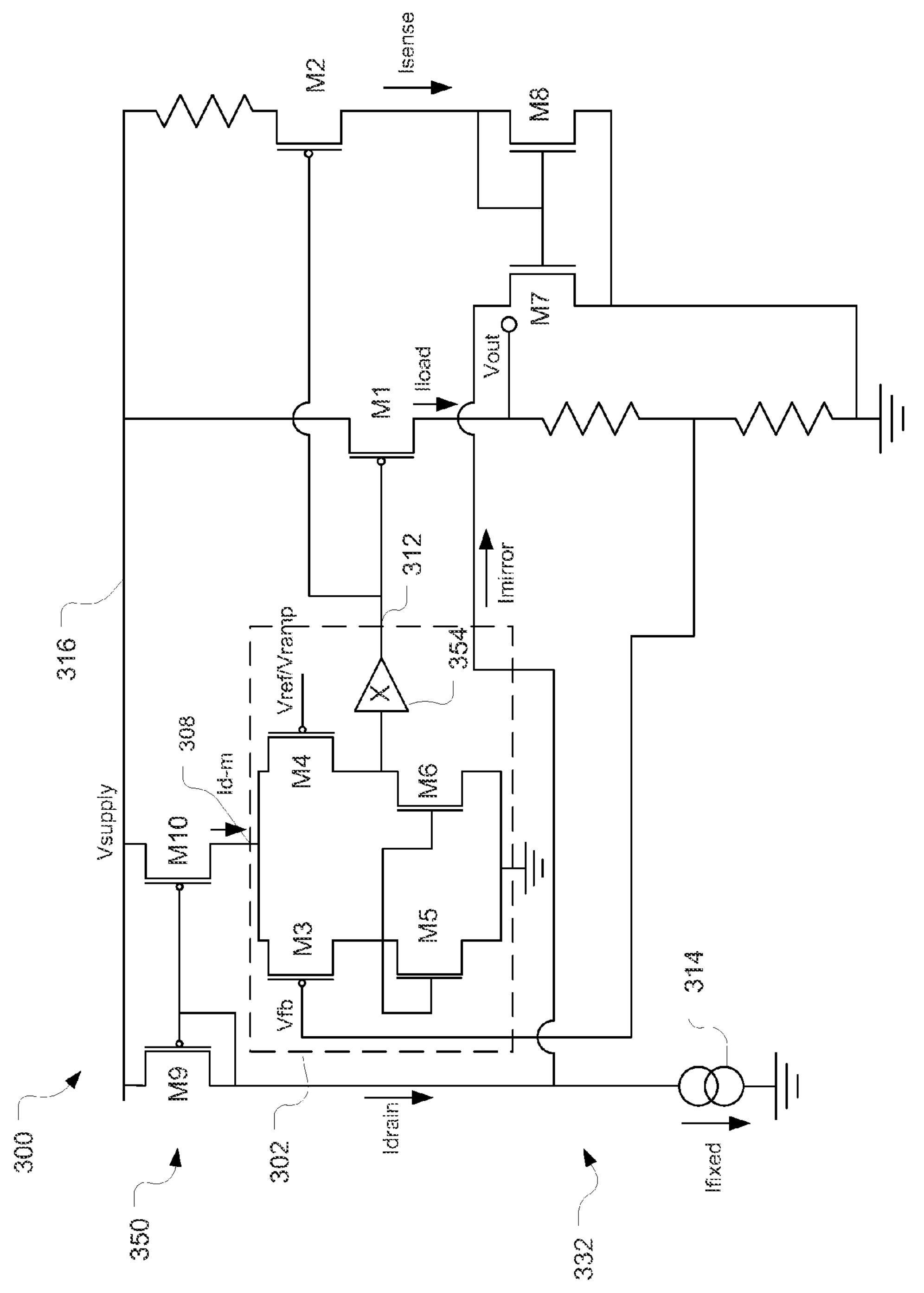
FIG. 3 illustrates another voltage regulator.

While the embodiment of FIG. 2 illustrates a single-stage op amp with a pair of n-type MOSFETS as the pair of input differential transistors, other embodiments may have other topologies. FIG. 3 illustrates an example of one such embodiment.

FIG. 3 illustrates a voltage regulator 300 in accordance with another embodiment. Other than the noted differences, the voltage regulator 300 may be similar to voltage regulators 100 and/or 200, with like-named components operating in similar manners.

The op amp 302 of the voltage regulator 300 may have a pair of p-type MOSFETS, e.g., transistors M3 and M4, acting as the input stage; and a pair of n-type MOSFETS, e.g., transistors M5 and M6. Transistors M3 and M4 may each have a source coupled with a positive power supply terminal 308. Transistors M3 and M4 may also each have a gate to receive differential inputs, e.g., Vfb and Vref/ramp, respectively. Transistor M4 may have a drain coupled with an output 312 of the op amp 302 through a buffer 354, which is configured to buffer an output signal provided to a pass transistor M1. A source of transistor M6 may also be coupled with the output 312 through the buffer 354. Transistors M5 and M6 may each include a drain coupled with ground. Transistors M5 and M6 may also each include a gate coupled with a source of M5 and a drain of M3.

A BVR feedback network 332 may include a current mirror 350 having, e.g., a pair of p-type MOSFETS, e.g., transistors M9 and M10. Transistor M9 may include a source coupled with supply rail 316, a drain coupled with constant current generator 314, and gate coupled with its drain. Transistor M10 may include a source coupled with the supply rail 316, a gate coupled with the drain and gate of transistor M9, and a drain coupled with the positive power supply terminal 308 of the op amp 302. Idrain, through transistor M9, may be mirrored in order to provide a proportional Id-m through transistor M10, which may be provided to the transistors of the input stage. The relative dimensions of the transistors M9 and M10 may determine the proportionality between Idrain and Id-m. For example, assuming transistor M9 has a width of a, M10 has a width of b, and both transistors have similar lengths, Id-m may be given by the following equation:

$$Id\text{-}m = I\text{drain} * (b/a). \quad \text{Equation 3}$$

Figure 4:
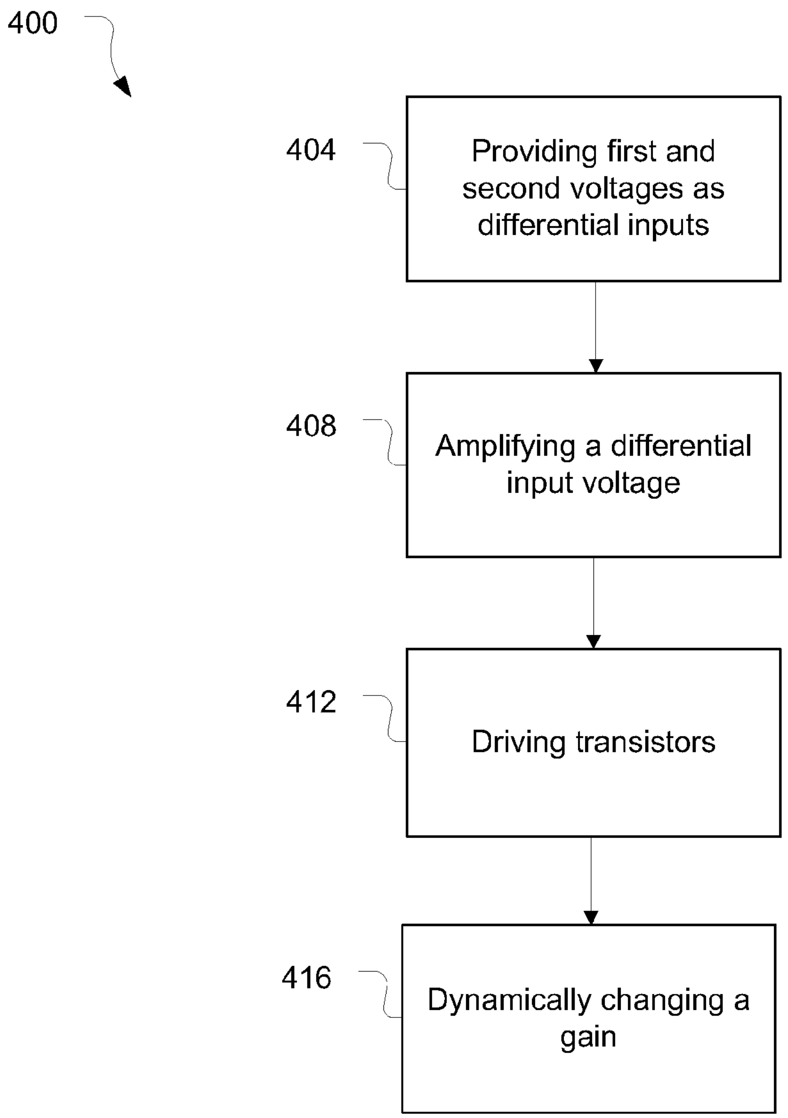
FIG. 4 illustrates a flowchart of an operation of a voltage regulator.

FIG. 4 illustrates a flowchart 400 depicting operation of a voltage regulator, e.g., voltage regulator 100, 200, or 300, in accordance with some embodiments.

At block 404 ("Providing first and second voltages as differential inputs"), the operation may include providing two voltages, e.g., Vramp/Vref and Vfb, to an operational amplifier, e.g., op amp 102, as differential inputs. In some embodiments, e.g., as discussed below with respect to FIG. 5, the Vramp/Vref may be provided by a transceiver of an apparatus implementing the voltage regulator.

At block 408 ("Amplifying a differential input voltage"), the operation may include amplifying, e.g., by the op amp 102, a difference between two differential inputs of an operational amplifier. In this context, the operational amplifier may also be referred to as a differential amplifier.

At block 412 ("Driving transistors"), the operation may include driving, e.g., by op amp 102, a pass transistor, e.g., M1, and a replica transistor, e.g., M2, with an amplified differential input voltage provided to gates of the respective transistors. M1, as described above, may provide a Vout and Iload based on the application of the amplified differential input voltage to its gate. M2, as described above, may provide Isense based on application of the amplified differential input voltage to its gate.

At block 416 ("Dynamically changing a gain"), the operation may include dynamically changing, e.g., by BVR network 132, a gain of an operational amplifier, e.g., op amp 102. As discussed above, this dynamic changing of the gain of an operational amplifier may work to reduce a variation in the bandwidth of a feedback network due to changes in Iload.

Figure 5:
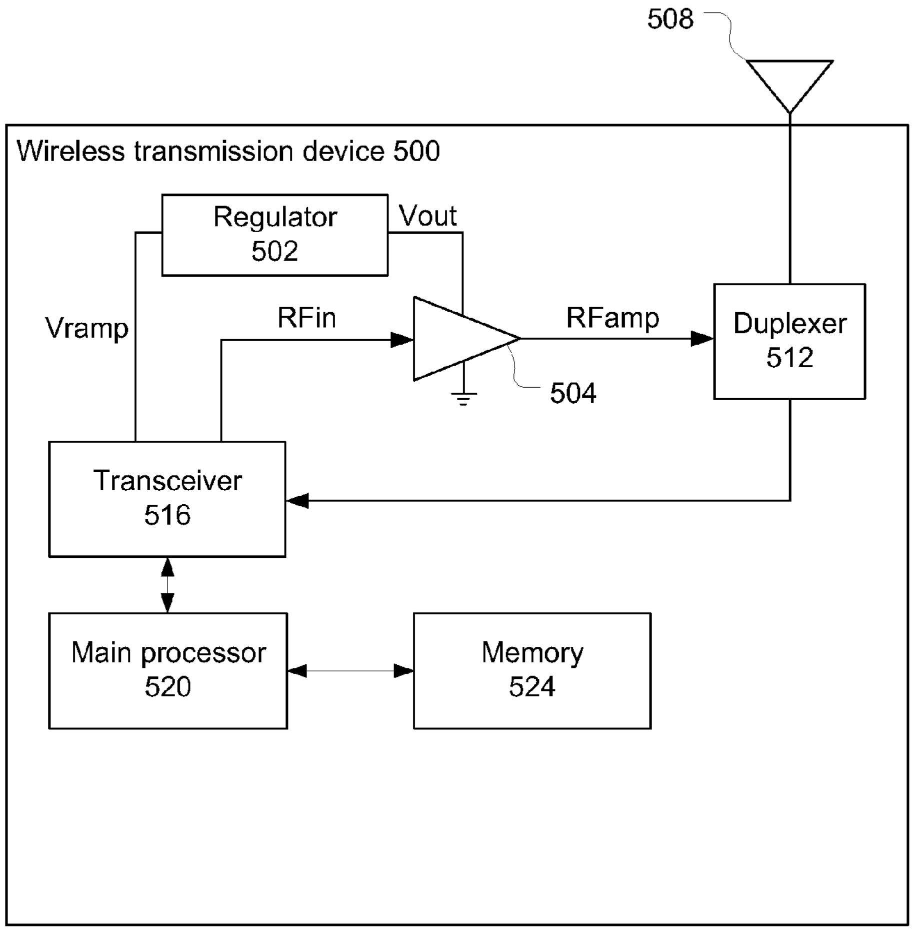
FIG. 5 illustrates a wireless transmission device implementing a voltage regulator, all in accordance with at least some embodiments.

The voltage regulators 100, 200, and/or 300 may be incorporated into any of a variety of apparatuses and systems. A block diagram of an exemplary wireless transmission device 500 incorporating a voltage regulator 502 is illustrated in FIG. 5. The wireless transmission device 500 (hereinafter also referred to as "device 500") may include a power amplifier 504, an antenna structure 508, a duplexer 512, a transceiver 516, a main processor 520, and a memory 524 coupled with each other as shown. While the device 500 is shown with transmitting and receiving capabilities, other embodiments may include wireless transmission devices without receiving capabilities.

In various embodiments, the device 500 may be, but is not limited to, a mobile telephone, a paging device, a personal digital assistant, a text-messaging device, a portable computer (e.g., a netbook, a laptop computer, etc.), a desktop computer, a telecommunications base station, a subscriber station, an access point, a radar, a satellite communication device, or any other device capable of wirelessly transmitting RF signals.

The main processor 520 may execute a basic operating system program, stored in the memory 524, in order to control the overall operation of the device 500. For example, the main processor 520 may control the reception of signals and the transmission of signals by transceiver 516. The main processor 520 may be capable of executing other processes and programs resident in the memory 524 and may move data into or out of memory 524, as desired by an executing process.

The transceiver 516 may receive outgoing data (e.g., voice data, web data, e-mail, signaling data, etc.) from the main processor 520, may generate the RFin signal to represent the outgoing data, and provide the RFin signal to the power amplifier 504. The transceiver 516 may also provide Vramp to the regulator 502. Vramp may be provided based on the power desired by the power amplifier 504, with the amplitude of Vramp dictating the output power. Vramp may vary over operation of the device 500. Variation of Vramp may be due, at least in some embodiments, to the device 500 switching between different amplification modes.

The power amplifier 504 may amplify the RFin signal in accordance with a selected amplification mode. The amplified RFamp signal may be forwarded to the duplexer 512 and then to the antenna structure 508 for an over-the-air (OTA) transmission. In various embodiments, the antenna structure 508 may include one or more directional and/or omnidirectional antennas, including, e.g., a dipole antenna, a monopole antenna, a patch antenna, a loop antenna, a microstrip antenna or any other type of antenna suitable for OTA transmission/reception of RF signals.

In general, the power amplifier 504 may be designed to operate based on an ideal load to the antenna structure 508. However, the load seen by the power amplifier 504 may vary due to operational factors. For example, if the device 500 is a phone, the load may vary depending on how a user is holding the device 500 and how much distance is between the antenna structure 508 and a user's body. In these instances, a mismatch may occur between the power amplifier 504 and the antenna structure 508, resulting in current consumption exceeding a desired value and a battery level quickly reducing. Increased current consumption by the power amplifier 504 may vary the Iload of the regulator 502. However, as discussed above, the regulator 502 may be capable of providing a fairly constant gain-bandwidth product notwithstanding Iload variations. Therefore, the regulator 502 may be less susceptible to inefficiencies caused by mismatch conditions faced by the power amplifier 504.

Those skilled in the art will recognize that the device 500 is given by way of example and that, for simplicity and clarity, only so much of the construction and operation of the device 500 as is necessary for an understanding of the embodiments is shown and described. Various embodiments contemplate any suitable component or combination of components performing any suitable tasks in association with wireless transmission device 500, according to particular needs. Moreover, it is understood that the transmission device 500 should not be construed to limit the types of devices in which embodiments may be implemented.

Although the present disclosure has been described in terms of the above-illustrated embodiments, it will be appreciated by those of ordinary skill in the art that a wide variety of alternate and/or equivalent implementations calculated to achieve the same purposes may be substituted for the specific embodiments shown and described without departing from the scope of the present disclosure. Those with skill in the art will readily appreciate that the teachings of the present disclosure may be implemented in a wide variety of embodiments. This description is intended to be regarded as illustrative instead of restrictive.

What is claimed is:

1. A voltage regulator comprising:

an operational amplifier having an output;

a pass transistor having a first gate coupled with the output of the operational amplifier and configured to provide a load current; and a network including a replica transistor having a second gate coupled with the output of the operational amplifier, the network being configured to provide a current, which is based on the load current, to the operational amplifier, wherein the current comprises a mirror current and the replica transistor is configured to provide a sense current that is proportional to the load current, and the mirror current is proportional to the sense current.

2. The voltage regulator of claim 1, wherein the network comprises:

a current mirror configured to generate the mirror current based on the sense current.

3. The voltage regulator of claim 1, wherein the pass transistor is a p-type metal oxide semiconductor field effect transistor.

4. The voltage regulator of claim 1, further comprising:

a resistor coupled with, and disposed between, the replica transistor and a supply rail.

5. The voltage regulator of claim 1, wherein the replica transistor is proportional to the pass transistor.

6. A voltage regulator comprising:

an operational amplifier having an output, a pass transistor having a first gate coupled with the output of the operational amplifier and configured to provide a load current;

a network including a replica transistor having a second gate coupled with the output of the operational amplifier, the network being configured to provide a current, which is based on the load current, to the operational amplifier; and a feedback network coupled with the pass transistor and the operational amplifier and configured to provide a feedback voltage to the operational amplifier that is proportional to an output voltage at a drain of the pass transistor.

7. The voltage regulator of claim 6, wherein the operational amplifier includes a first input coupled with the feedback network and a second input to receive a reference or ramp voltage.

8. A voltage regulator comprising:

an operational amplifier having an output;

a pass transistor having a first gate coupled with the output of the operational amplifier and configured to provide a load current; and a network including a replica transistor having a second gate coupled with the output of the operational amplifier, the network being configured to provide a current, which is based on the load current, to a power supply of the operational amplifier to change a gain of the operational amplifier.

9. The voltage regulator of claim 8, wherein the operational amplifier includes a pair of input differential transistors, the current is a first current, and the network comprises:

a current mirror coupled with, and disposed between, a supply rail and the pair of input differential transistors and configured to mirror a second current to generate the first current and to provide the first current to the pair of input differential transistors at a positive power supply terminal of the operational amplifier.

10. A voltage regulator comprising:

an operational amplifier having an output;

a pass transistor having a first gate coupled with the output of the operational amplifier and configured to provide a load current; and a network including a replica transistor having a second gate coupled with the output of the operational amplifier, the network being configured to provide a current, which is based on the load current, to the operational amplifier, wherein the operational amplifier includes a pair of input differential transistors configured to receive the current at a negative power supply terminal of the operational amplifier.

11. A method of providing a regulated output voltage comprising:

driving a transistor with an amplified differential input voltage, generated by an operational amplifier, to provide the regulated output voltage and an output load current; and dynamically changing a gain of the operational amplifier, based on the output load current, by dynamically changing a current provided to an input stage of the operational amplifier.

12. The method of claim 11, wherein the input stage comprises a pair of input differential transistors.

13. The method of claim 11, wherein the transistor is a first transistor and said dynamically changing the gain comprises:

driving a second transistor, which is proportional in size to the first transistor, with the amplified differential input voltage;

generating, with the second transistor, a sense current that is proportional to the output load current;

mirroring the sense current to provide a mirror current; and providing a current based on the mirror current to the operational amplifier.

14. The method of claim 11, further comprising:

providing a first voltage to the operational amplifier;

providing a second voltage to the operational amplifier; and generating, with the operational amplifier, the amplified differential input voltage based on the first and second voltages.

15. The method of claim 14, wherein said providing the first voltage comprises providing a feedback voltage and said providing the second voltage comprises providing a ramp voltage that varies with time during said providing of the regulated output voltage.

16. A system comprising:

a voltage regulator having an operational amplifier configured to output a voltage, a transistor coupled with the operational amplifier and configured to provide an output load current and a regulated output voltage based on the voltage, and a network to dynamically change a gain of the operational amplifier based on the output load current; and a power amplifier including a power input supply terminal coupled with the voltage regulator to receive the regulated output voltage, the power amplifier configured to amplify a radio frequency (RF) signal to be transmitted over the air.

17. The system of claim 16, further comprising:

a transceiver coupled with the voltage regulator and the power amplifier and configured to provide a ramp voltage to the voltage regulator and the RF signal to the power amplifier.

18. The system of claim 16, wherein the transistor is a first transistor and the network comprises:

a second transistor, which is proportional to the first transistor, coupled with the operational amplifier and configured to generate a sense current that is proportional to the output load current; and a current mirror configured to mirror the sense current to provide the current.

19. The system of claim 16, wherein the operational amplifier includes an input stage provided with a current based on the output load current.

* * * * *